US010424198B2

(12) United States Patent
Parsons, Jr.

(10) Patent No.: US 10,424,198 B2
(45) Date of Patent: Sep. 24, 2019

(54) MOBILE STARTING LIGHT SIGNALING SYSTEM

(71) Applicant: John Michael Parsons, Jr., Riverview, FL (US)

(72) Inventor: John Michael Parsons, Jr., Riverview, FL (US)

( * ) Notice: Subject to any disclaimer, the term of this patent is extended or adjusted under 35 U.S.C. 154(b) by 205 days.

(21) Appl. No.: 15/787,570

(22) Filed: Oct. 18, 2017

(65) Prior Publication Data

US 2019/0114910 A1    Apr. 18, 2019

(51) Int. Cl.
*G08G 1/0965* (2006.01)
*B60Q 3/70* (2017.01)
*B60Q 3/16* (2017.01)

(52) U.S. Cl.
CPC ............. *G08G 1/0965* (2013.01); *B60Q 3/16* (2017.02); *B60Q 3/70* (2017.02)

(58) Field of Classification Search
None
See application file for complete search history.

(56) References Cited

U.S. PATENT DOCUMENTS

| 4,284,941 A * | 8/1981 | Regueiro | G05D 1/0265 180/168 |
| 7,991,550 B2 * | 8/2011 | Zeng | G01S 7/4026 340/435 |
| 8,686,873 B2 * | 4/2014 | Demirdjian | G08G 1/164 340/425.5 |
| 8,952,830 B2 * | 2/2015 | Sims | B60Q 9/008 340/425.5 |
| 2004/0095228 A1 * | 5/2004 | Fugit | B60Q 1/50 340/425.5 |
| 2006/0044122 A1 * | 3/2006 | Dialinakis | B60D 1/36 340/431 |
| 2007/0159310 A1 * | 7/2007 | Ball | B60D 1/36 340/431 |
| 2007/0252723 A1 * | 11/2007 | Boss | G08G 1/162 340/902 |
| 2010/0066517 A1 * | 3/2010 | Posselius | G01S 5/0247 340/435 |
| 2010/0332051 A1 * | 12/2010 | Kormann | A01D 43/073 701/2 |
| 2011/0001825 A1 * | 1/2011 | Hahn | B60R 1/00 348/148 |

(Continued)

*Primary Examiner* — Wayne Young
*Assistant Examiner* — Renee Dorsey
(74) *Attorney, Agent, or Firm* — Tiffany C. Miller; Inventions International Inc.

(57) ABSTRACT

A mobile starting light signaling system for a pair of vehicles in a race having at least two units. A primary unit is connected to a primary vehicle and a second unit is connected to a secondary vehicle. Each unit has a sensor in electrical communication with a display. The display has a green light, a yellow light, and a red light. The first sensor is in bidirectional communication with the second sensor to determine whether or not the primary vehicle is in alignment with the secondary vehicle. The red light is illuminated when the primary vehicle is not in alignment with the secondary vehicle. The yellow light is illuminated when the primary vehicle is in alignment with the secondary vehicle. The green light is illuminated to indicate the start of the race when the primary vehicle is in alignment with the secondary vehicle for a predetermined time.

9 Claims, 3 Drawing Sheets

(56) References Cited

U.S. PATENT DOCUMENTS

| | | | |
|---|---|---|---|
| 2011/0093194 A1* | 4/2011 | Paik | G01C 21/32 |
| | | | 701/532 |
| 2012/0081219 A1* | 4/2012 | Schiebahn | B60Q 9/004 |
| | | | 340/435 |
| 2014/0195138 A1* | 7/2014 | Stelzig | G08G 1/0116 |
| | | | 701/119 |
| 2015/0302741 A1* | 10/2015 | Vala | G08G 1/005 |
| | | | 340/916 |
| 2016/0009177 A1* | 1/2016 | Brooks | B60K 35/00 |
| | | | 340/468 |
| 2016/0023526 A1* | 1/2016 | Lavoie | B60D 1/305 |
| | | | 701/41 |
| 2016/0066012 A1* | 3/2016 | Friedlander | G06F 16/285 |
| | | | 725/34 |
| 2017/0061593 A1* | 3/2017 | Alahmar | G06T 7/70 |
| 2017/0282800 A1* | 10/2017 | Haen | B60R 1/00 |
| 2019/0052842 A1* | 2/2019 | Du | B60R 1/00 |

* cited by examiner

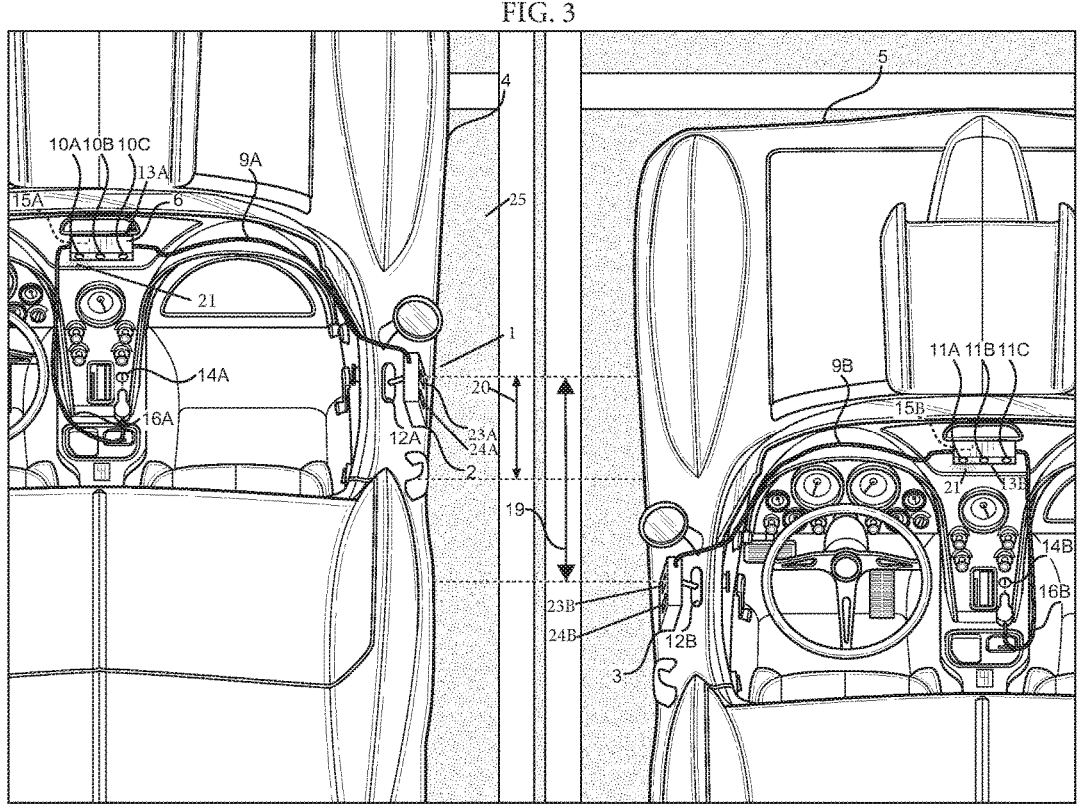

MOBILE STARTING LIGHT SIGNALING SYSTEM

BACKGROUND OF THE INVENTION

1. Field of the Invention

This invention relates, generally, to a mobile starting light signaling system. More particularly, it relates to a mobile device connected to a vehicle having a sensor capable of detecting alignment between two vehicles and light emitting unit signaling the start for a rolling start in vehicle racing.

2. Background Art

Drag racing or bracket racing is a sport where at least two vehicles are competing in a race on a track having a length of including, but not limited to, ⅛ mile or ¼ mile. It is common for pairs of vehicles to start racing from a stop or from a roll. Currently, drag races are started electronically by a system known as a Christmas tree. Many Christmas trees have a pair of columns each having a series of seven lights mounted on a structure. Each column of lights is associated with each driver or lane and a set of light beams located across the track. Each side of the column of lights is the same, whereby, each column having one blue LED light set arranged in a circle with a white line through the center, three amber bulbs, a green bulb, and a red bulb. In one example, the light beams are arranged with one set on the starting line and another set 7 inches behind it. When drivers are preparing to race, they cross the light beams 7 inches behind the starting line to activate the top half of the circle. Once pre-staged, drivers roll up 7 inches and cross the second light beam on the starting line to illuminate the bottom half of the circle. Once both drivers have crossed the staged sensor, an official starter or automatic starting system activates the next lighting sequence.

Many Christmas trees will sequentially illuminate each large amber light with a predetermined time delay in between them, followed by the green light after another predetermined time delay. The activation of the green light signals to the each driver of a vehicle to start the race by accelerating their vehicle. Leaving the staged line before the green light activates will stop the count down and illuminate the red light which results in the disqualification of the offending driver. The structure of current Christmas trees are not connected to the vehicle, rather, the Christmas tree is fixedly fastened to a track, to the median of a track, or hanging above the track from a pole or bracket. In addition, a light beam is located across the track as well. Having a fixed start light system is not desirable for vehicles in roll racing because the vehicles need to be rolling to start the race. Thus, there is a need for a start signal system connected to a vehicle and being capable of traversing at least a portion of the length of a track with a vehicle, whereby, the start signal system moves with a vehicle to be more effective at accommodating the demands of a roll start for racing vehicles.

Prior art start light systems, such as a Christmas tree, have a series of lights configured to sequentially illuminate to signify the start of a race. These start light systems are costly and require the upkeep and maintenance for them to operate efficiently. Further, these start light systems are stationary and are typically mounted within a designated track. Thus, there is a need for a mobile starting light system that is located within a vehicle. Having a start light system retained within a set of racing vehicles or connected to a set of racing vehicle eliminates the requirement of having to race at a track having a stationary Christmas tree, eliminates the need to maneuver heave equipment to a location site, and eliminates the need of time consuming installation of a Christmas tree on a track that doesn't have a start light system.

Prior art start light systems do not align vehicles during a rolling race start. A fixed Christmas tree is either associated with a line pained on a road or with a light beam sensor mounted across the track at the start line. This type of start light system accommodates races starting from a dead stop and is not effective at aligning vehicles during a roll start. It is more desirable for each pair of competing vehicles to both have their own dedicated start light display and a motion sensor connected directly to their vehicle. This will eliminate the need of having a Christmas tree and light beam sensors fixedly mounted to a track and providing the ability for the two vehicles to align with each other while the vehicles are both in motion.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for a mobile starting light signaling system for at least a pair of vehicles in a race has at least two sensor units. A primary unit is connected to a primary vehicle and a secondary unit is connected to a secondary vehicle. Each unit has a sensor in electrical communication with a display. The display has a green light emitting unit, a yellow light emitting unit, and a red light emitting unit. The primary sensor is in bidirectional communication with the secondary sensor to determine whether or not the primary vehicle is in alignment with the secondary vehicle. The red light emitting unit of the display is illuminated when the primary vehicle is not in alignment with the secondary vehicle. The yellow light emitting unit of the display is illuminated when the primary vehicle is in alignment with the secondary vehicle. The green light emitting unit of the display is illuminated to indicate the start of the race when the primary vehicle is in alignment with the secondary vehicle for a predetermined time, and which also includes improvements that overcome the limitations of prior art starting signals is now met by a new, useful, and non-obvious invention.

The following description and drawings are illustrative and are not to be construed as limiting. Numerous specific details are described to provide a thorough understanding. However, in certain instances, well know or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

In a preferred embodiment, the novel mobile starting light signaling system has a pair of units, a primary unit and a secondary unit. A primary unit is connected to a primary vehicle and a secondary unit is connected to a secondary vehicle. The units each have a sensor assembly configured to be removably connected to at least two vehicles. The sensor assembly can be connected to an outer portion of the vehicle or can be located inside of the vehicle. The sensor assembly is in electrical communication with a display having a light emitting unit. It is within the scope of this invention for the light emitting unit to include, but not be limited to, an LED, a bulb, or any other illuminating technology capable of illuminating light at specified colors. It is within the scope of this invention for the lights to be red, yellow, and green. It is within the scope of this invention for the sensor to be a wired or a wireless communication. The sensor has an IR LED transmitter and a photodiode receiver. The IR LED of the sensor of a primary unit is capable of transmitting a signal to the photodiode of the secondary unit, which receives the signal.

In an alternate embodiment, the display can illuminate light to a driver as a signal for the driver to accelerate the vehicle. It is within the scope of this current invention for the display to produce a sound or a vibration to indicate to a driver the start of the race.

In a preferred embodiment, the novel mobile starting light signaling system has a primary sensor assembly connected to a primary vehicle in bidirectional communication with a secondary sensor assembly connected to a secondary vehicle, whereby, the primary vehicle and the secondary vehicle are configured to roll start during a race. The primary vehicle and the secondary vehicle communicate with each other via the novel sensor assembly. When the primary vehicle is not in alignment with the secondary vehicle, the red light of the primary display of the primary vehicle and the red light of the secondary display of the secondary vehicle will illuminate. As the vehicles roll forward, the yellow light of the primary display of the primary vehicle and the yellow light of the secondary display of the secondary vehicle will illuminate once the primary vehicle and the secondary vehicle are aligned.

When the primary vehicle and the secondary vehicle are both aligned, both vehicles are positioned in a side by side orientation. The novel mobile starting light signaling system can monitor and determine when both the primary vehicle and the secondary vehicle are next to each other and properly aligned for the start of a race. The positioning of the primary sensor assembly is mounted on a primary vehicle in view of the secondary sensor assembly which is mounted on a secondary vehicle. When the mounted sensor assembly of the primary vehicle is in view of the mounted sensor assembly of the secondary vehicle, the sensor assembly of a first vehicle can determine alignment with the opposing sensor assembly. This bidirectional communication occurs when a signal has been transmitted from one sensor assembly and is received by another sensor assembly to determine alignment of the vehicles and to then prompt both of the display to simultaneously illuminate in response to the alignment determination.

The sensor assembly can be programmed to illuminate the lights of the display at a predetermined time depending on the type of race rules being implemented. The green light of the primary display of the primary vehicle and the green light of the secondary display of the secondary vehicle will simultaneously illuminate once the primary vehicle and the secondary vehicle are aligned for a predetermined time. Once the green light is simultaneously illuminated on both displays, the drivers of both the primary vehicle and the secondary vehicle accelerate to start the race.

In an alternate embodiment, the sensor assembly can be formed within the display as one unit, thereby, eliminating the need for a separate sensor assembly and a separate light display. In another embodiment, the sensor assembly and the display can by formed within the vehicle such as within the dashboard of a vehicle.

In a preferred embodiment, the novel mobile starting light signaling system uses the power supply of a vehicle or a self-contained battery in each unit.

In a preferred embodiment, the novel mobile starting light signaling system has a first sensor assembly. The first sensor assembly has a transmitter. The first sensor assembly has a receiver. The first sensor assembly is configured to connect to a first vehicle. The mobile starting light signaling system has a first display in electrical communication with the first sensor assembly. The first display is configured to connect to the first vehicle. The first display has a first light emitting unit configured to illuminate a first color. The first display has a second light emitting unit configured to illuminate a second color. The first display having a third light emitting unit configured to illuminate a third color.

The novel mobile starting light signaling system has a second sensor assembly. The second sensor assembly has a transmitter. The second sensor assembly has a receiver. The second sensor assembly is configured to connect to a second vehicle. A second display is in electrical communication with the second sensor assembly. The second display is configured to connect to the second vehicle. The second display has a first light emitting unit configured to illuminate a first color. The second display has a second light emitting unit configured to illuminate a second color. The second display has a third light emitting unit configured to illuminate a third color.

The first sensor assembly of the first vehicle is in bidirectional communication with a second sensor assembly of a second vehicle, whereby, the first display and the second display each simultaneously illuminate a first color of the first light emitting unit when the first sensor assembly is not in alignment with the second sensor assembly. The first display and the second display each simultaneously illuminate a second color of the second light emitting unit when the first sensor assembly is in alignment with the second sensor assembly. The first display and the second display each simultaneously illuminate a third color of the third light emitting unit when the first sensor assembly is in alignment with the second sensor assembly for a predetermined time, whereby, the illumination of a third color of the light emitting unit is configured to indicate to each driver when to accelerate for the start of the race.

In an embodiment, the novel mobile starting light signaling system can have a first display having a power supply from the first vehicle. The first display can have a power supply from a battery. The second display can have a power supply from the second vehicle. The second display can have a power supply from a battery.

In an alternate embodiment, the novel mobile starting light signaling system can have a first display emitting a sound to indicate alignment of said first sensor assembly with the second sensor assembly. The second display can emit a sound to indicate alignment of the first sensor assembly with the second sensor assembly.

In yet another embodiment, the novel mobile starting light signaling system can have a first display of a first vehicle emitting a vibration to indicate alignment of the first sensor assembly with the second sensor assembly. The second display of the second vehicle can emit a vibration to indicate alignment of the first sensor assembly with the second sensor assembly.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
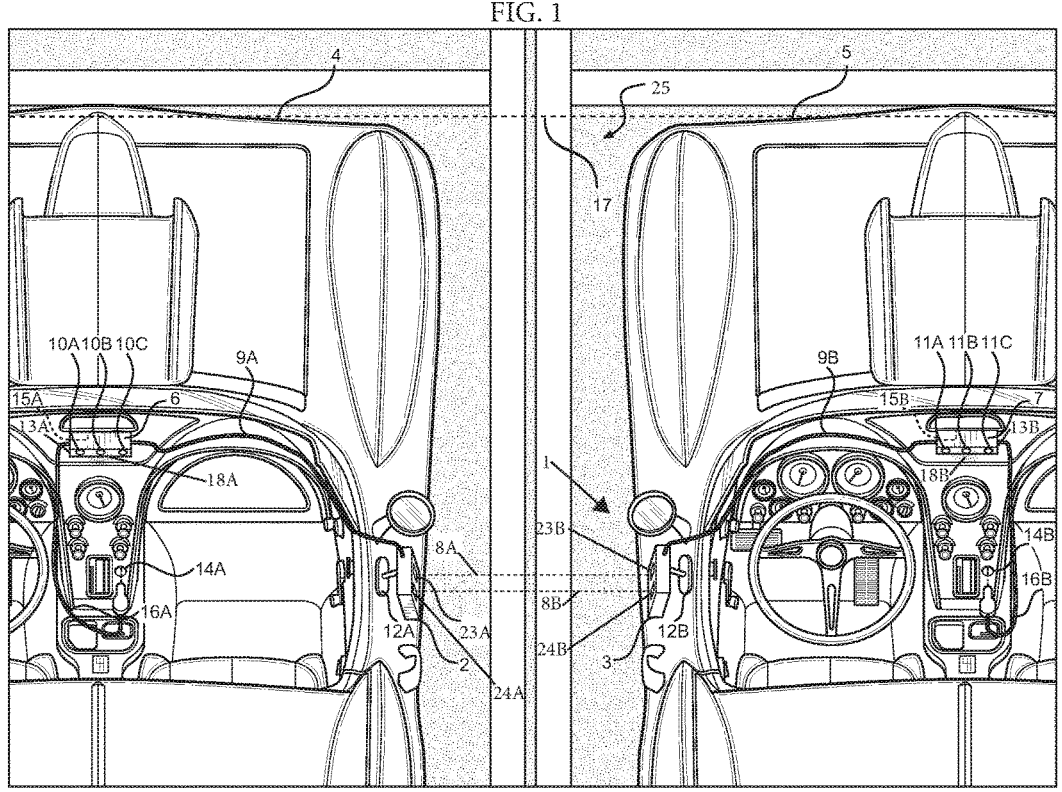
FIG. 1 is a perspective view of the novel mobile starting light signaling system having a primary sensor assembly connected to a primary vehicle in alignment with a secondary sensor system being connected to a secondary vehicle.
Figure 2:
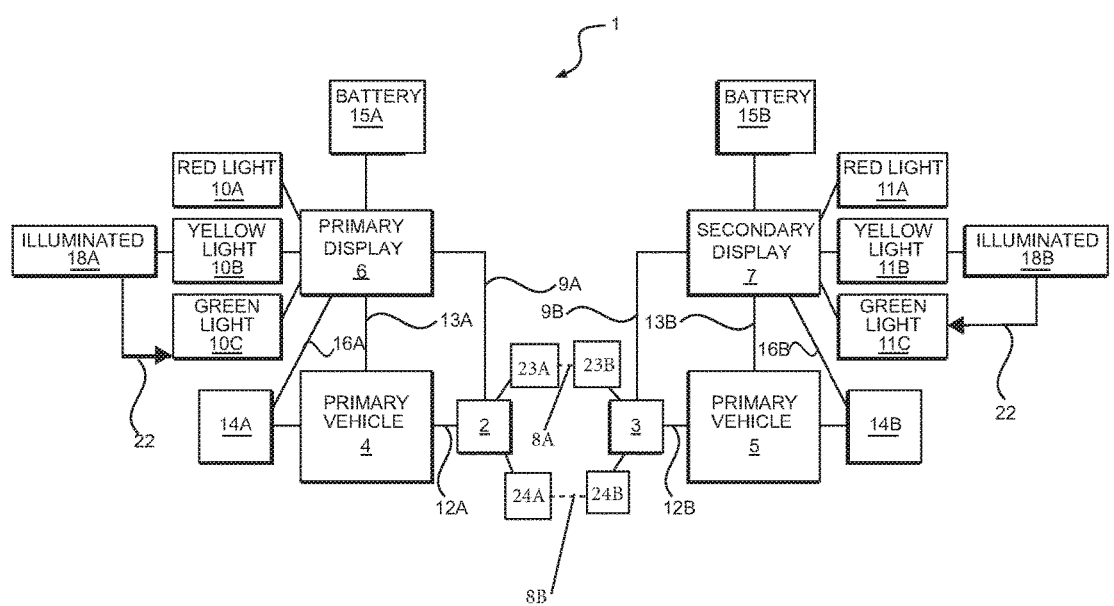
FIG. 2 is a block diagram of the novel mobile starting light signaling system having a primary sensor assembly connected to a primary vehicle in alignment with a secondary sensor system being connected to a secondary vehicle; and, FIG. 3 is a perspective view of the novel mobile starting light signaling system having a primary sensor assembly connected to a primary vehicle not in alignment with a secondary sensor system being connected to a secondary vehicle.

FIGS. 1-3 illustrate an embodiment of novel mobile starting light signaling system 1 in accordance with the present disclosure. Primary sensor assembly 2 is mounted 12A to primary vehicle 4. Primary sensor assembly 2 has primary transmitter 23A and primary receiver 24A. Secondary sensor assembly 3 is mounted to 12B secondary vehicle 5. Secondary sensor assembly 3 has secondary transmitter 24B and secondary receiver 23B. It is within the scope of this invention for primary sensor assembly 2 to be mounted on 12A the outer surface of vehicle 4 or any surface of primary vehicle 4 capable of orienting primary sensor assembly 2 with secondary sensor assembly 3 to determine alignment of primary vehicle 4 and secondary vehicle 5. It is within the scope of this invention for secondary sensor assembly 3 to be mounted on 12B the outer surface of secondary vehicle 5 or any surface of vehicle 5 capable of orienting secondary sensor assembly 3 with primary sensor assembly 2 to determine alignment of primary vehicle 4 and secondary vehicle 5.

FIGS. 1-3 further illustrate primary sensor assembly 2 being in electrical communication 9A with primary display 6. Primary display 6 is connected 13A to a surface of primary vehicle 4. It is within the scope of this invention for primary display 6 to be mounted 13A to the interior of primary vehicle 4, the exterior of primary vehicle 4, or any surface of primary vehicle 4 capable of orienting the light emitting units 10A-C of primary display 6 within visual view of a driver operating primary vehicle 4. Primary display 6 can have battery 15A. It is within the scope of this invention for a battery 15A, a cigarette lighter 14A of primary vehicle 4, or any power supply from primary vehicle 4 to be capable of powering primary display 6 and primary sensor assembly 2 of mobile starting light signaling system 1. Primary display 6 and primary sensor assembly 2 of mobile starting light signaling system 1 are in electrical communication 16A with a power supply of primary vehicle 4.

FIGS. 1-3 show secondary sensor assembly 3 being in electrical communication 9B with secondary display 7. Secondary display 7 is connected 13B to a surface of secondary vehicle 5. It is within the scope of this invention for secondary display 7 to be mounted 13B to the interior of secondary vehicle 5, the exterior of secondary vehicle 5, or any surface of secondary vehicle 5 capable of orienting the light emitting units 11A-C of secondary display 7 within visual view of a driver operating secondary vehicle 5. Secondary display 7 can have battery 15B. It is within the scope of this invention for a battery 15B, a cigarette lighter 14B of secondary vehicle 5, or any power supply from secondary vehicle 5 to be capable of powering secondary display 7 and secondary sensor assembly 3 of mobile starting light signaling system 1. Secondary display 7 and secondary sensor assembly 3 of mobile starting light signaling system 1 are in electrical communication 16B with a power supply of secondary vehicle 5.

Primary display 6 has at least three light emitting units 10A-10C associated with three different colors. It is within the scope of this invention for the light emitting units 10A-10C to be any color or different colors. In a preferred embodiment as shown in FIGS. 1-3, primary display 6 has red light 10A, yellow light 10B, and green light 10C. Secondary display 7 has at least three light emitting units 11A-11C associated with three different colors. It is within the scope of this invention for the light emitting units 11A-11C to be any color or different colors. In a preferred embodiment as shown in FIGS. 1 and 2, secondary display 7 has red light 11A, yellow light 11B, and green light 11C. The light emitting units can be positioned on either of the displays in any orientation, however, it is a preferred embodiment for the light emitting units to be horizontally aligned or vertically aligned in the order of red light, yellow light, and green light.

FIGS. 1 and 2 depict primary transmitter 23A of primary sensor assembly 2 being aligned 8A with secondary receiver 23B of secondary sensor assembly 3. When secondary receiver 23B receives the signal from primary transmitter 23A, alignment is determined and an authentication is electrically communicated to primary display 6 and secondary display 7. The authentication is any indicator generated by the display that indicates to a driver of a vehicle when the two vehicles are in alignment to start the race, including, but not be limited to, an illumination of at least one light, a sound, or a vibration. Primary sensor assembly 2 mounted on primary vehicle 4 is aligned with secondary sensor assembly 3 of secondary vehicle 5 when a successful transmission of a signal is processed by a coordinating receiver of another vehicle to authenticate alignment of the two vehicles.

Secondary transmitter 24B of secondary sensor assembly 3 is aligned 8B with primary receiver 24A of primary sensor assembly 2. When primary receiver 24A receives the signal from secondary transmitter 24B, an authentication determining alignment is electrically communicated to primary display 6 and secondary display 7. The authentication prompt can include, but not be limited to, an illumination of at least one light, a sound, or a vibration. It is within the scope of this current invention for a command or authentication prompt to be any indicator that encourages the driver of a vehicle to accelerate upon the start of a race.

Alignment 8A and 8B of primary sensor assembly 2 and secondary sensor assembly 3 occurs during a roll start of a race when both vehicles are traversing at least a portion of the length of the track or rolling in a forward motion down the track. Once primary vehicle 4 and secondary vehicle 5 are lined up on track 25 (FIG. 1) next to each other or in a side-by-side orientation 17 (FIG. 1), the sensor assembly of each vehicle will be in view of each other. A signal from each sensor assembly is transmitted to the other sensor assembly, where it is received and interpreted to determine alignment to the pair of vehicles.

FIGS. 1 and 2 best illustrate an example when primary transmitter 23A of primary sensor assembly 2 is aligned 8A with secondary receiver 23B and/or when secondary transmitter 24B of secondary sensor assembly 3 is aligned 8B with primary receiver 24A of primary sensor assembly 2, yellow light 10B of primary display 6 in primary vehicle 4 and yellow light 11B of secondary display 7 in secondary vehicle 5 will simultaneously illuminate 18A-18B. When yellow lights 10B and 11B are simultaneously illuminated 18A-18B, the drivers of each respective vehicle will interpret the simultaneous illumination 18A and 18B as the two vehicles being in alignment. When primary vehicle 4 and secondary vehicle 5 have been in alignment for a predetermined time 22 (FIG. 2), green light 10C of primary display 6 in primary vehicle 4 and green light 11C of secondary display 7 in secondary vehicle 5 will simultaneously illuminate, thereby, indicating to each driver to accelerate at the same time for the start of the race.

FIG. 3 illustrates primary sensor assembly 2 not being in alignment 19 with secondary sensor assembly 7. When primary sensor assembly 2 is not in alignment 19 with secondary sensor assembly 7, primary vehicle 4 is not oriented side-by-side with secondary vehicle 5 in a position that is acceptable for the start of a race to begin. The race track, drag strip, or any racing surface 25 that the race is being performed on has at least two lanes oriented parallel to each other. Primary vehicle 4 and secondary vehicle 5 traverse the length of their respective lane of the track during a race. In an example, primary vehicle 4 may be ahead of or behind secondary vehicle 5, however, the two vehicles are not in alignment 20 (FIG. 3) unless the sensor assemblies 2 and 3 are oriented parallel 8 to each other as shown in FIG. 1 within a predetermined range that is an acceptable condition for the start of a race. Red light 10A of primary display 6 in primary vehicle 4 and red light 11A of secondary display 7 in secondary vehicle 5 will both simultaneously illuminate 21 when primary sensor assembly 2 is not in alignment 19 with secondary sensor assembly 3.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

The invention claimed is:

1. A mobile starting light signaling system, comprising:
a first sensor assembly, said first sensor assembly having a transmitter, said first sensor assembly having a receiver, said first sensor assembly is configured to connect to a first vehicle;
a first display, said first display is in electrical communication with said first sensor assembly, said first display is configured to connect to said first vehicle, said first display having a first light emitting unit configured to illuminate a first color, said first display having a second light emitting unit configured to illuminate a second color, said first display having a third light emitting unit configured to illuminate a third color;
a second sensor assembly, said second sensor assembly having a transmitter, said second sensor assembly having a receiver, said second sensor assembly is configured to connect to a second vehicle;
a second display, said second display is in electrical communication with said second sensor assembly, said second display is configured to connect to said second vehicle, said second display having a first light emitting unit configured to illuminate a first color, said second display having a second light emitting unit configured to illuminate a second color, said second display having a third light emitting unit configured to illuminate a third color; and,
said first sensor assembly of said first vehicle is in bidirectional communication with said second sensor assembly of said second vehicle, whereby, said first display and said second display each simultaneously illuminating said first color of said first light emitting unit when said first sensor assembly is not in alignment with said second sensor assembly, said first display and said second display each simultaneously illuminating said second color of said second light emitting unit when said first sensor assembly is in alignment with said second sensor assembly, said first display and said second display each simultaneously illuminating said third color of said third light emitting unit when said first sensor assembly is in alignment with said second sensor assembly for a predetermined time, whereby, said illumination of said third color of said light emitting unit is configured to indicate to each driver when to accelerate for the start of the race.

2. The mobile starting light signaling system of claim 1, further comprising said first display has a power supply from said first vehicle.

3. The mobile starting light signaling system of claim 1, further comprising said first display has a power supply from a battery.

4. The mobile starting light signaling system of claim 1, further comprising said second display has a power supply from said second vehicle.

5. The mobile starting light signaling system of claim 1, further comprising said second display has a power supply from a battery.

6. The mobile starting light signaling system of claim 1, further comprising said first display emitting a sound to indicate alignment of said first sensor assembly with said second sensor assembly.

7. The mobile starting light signaling system of claim 1, further comprising said second display emitting a sound to indicate alignment of said first sensor assembly with said second sensor assembly.

8. The mobile starting light signaling system of claim 1, further comprising said first display of said first vehicle emitting a vibration to indicate alignment of said first sensor assembly with said second sensor assembly.

9. The mobile starting light signaling system of claim 1, further comprising said second display of said second vehicle emitting a vibration to indicate alignment of said first sensor assembly with said second sensor assembly.

* * * * *